April 2, 1957  H. T. MERYMAN ET AL  2,787,784
TRIBOELECTRIC DETECTING SYSTEM
Filed April 30, 1954

INVENTOR
HAROLD T. MERYMAN
HAMPTON W. SHIRER

BY
*Semmes & Semmes*
ATTORNEYS

United States Patent Office 2,787,784
Patented Apr. 2, 1957

2,787,784

TRIBOELECTRIC DETECTING SYSTEM

Harold T. Meryman, Cabin John, Md., and Hampton W. Shirer, Mission, Kans.

Application April 30, 1954, Serial No. 426,631

8 Claims. (Cl. 340—258)

The present invention relates to sensing devices and to the use of a conductive cable as an extended triboelectric transducer. More specifically, the invention includes the new use of a "noisy" cable as a material element in a sensing device which is adapted to receive and transmit disturbing forces for the purposes of determining the presence of foreign moving objects through any given territory or area wherein such a cable may be extended. One specific adaptation of the invention relates to the use of the noisy cable for the detection of fire or excessive heat in a given area.

Continuous cables as such, as the sensitive elements of alarm systems are common in fire-detection and in such instances the cable usually contains a fusible insulation or conductor. On the other hand, for burglar alarm systems and the like, piezoelectric or magnetic transducers have been applied to fence strands and other structures; but in most all such instances the transducer is not actually a continuous element. There are substantially five known principal methods of burglar detection. These are as follows: The continuous resistance wire which when interrupted sounds the alarm; the photoelectric cell in which obstruction of the optical path triggers the alarm system; the capacity relay in which introduction of a body into the field of an antenna changes its capacity to give an alarm signal; the simple trip wire in which system the wire is connected at one end to a switch which is closed when the wire is pushed or pulled; the piezoelectric or magnetic transducer attached to a wire and adapted to sense vibration whenever the wire is moved. The principal limitations of all these systems lie in their lack of portability, for they must be carefully and as a rule permanently installed. Most of them require a significant power supply. In general they are not adaptable to irregular terrain or to the detection of small perturbances. In addition, most of these methods require expensive installations and involve complex electronic equipment.

The advantages of the present device over known detecting devices would appear obvious to those skilled in the art. For instance, the device is extremely portable. The sensing element may be laid at random over any type of irregular terrain either indoors or in the field. It has an exceptionally high and adjustable sensitivity at every point throughout the entire length of the sensitive cable. The current requirements are extremely low and well adapted to field use from dry cell batteries. The efficiency of the device is relatively unaffected by the length of the sensing element, the cable. The sensing element itself is small and relatively invisible. It cannot be compromised or disarmed. By a simple adjustment of sensitivity it can be rendered adaptable to the detection of humans or to the smallest of mammalian life. In addition, this device is adaptable to fire alarm systems.

Heretofore, "noisy" cable has been something to be corrected in conductor adaptations. "Noisy" cable may be defined as a conductor wire in which electric noise is developed upon movement of the cable. Triboelectric current generated by friction is generally regarded as the chief cause of electrical noise in cables. More specifically, the disturbance or movement of a conductive cable normally causes slight friction between conductor and dielectric such as may produce bursts of electrical noise or interference. Successful attempts have been made to overcome this common "noise" problem in the development of conductive cable. For instance, the bonding of insulator to conductor and the coating of insulating dielectrics with conductive paint are advances in the conductive field, to mention but a few. Whereas the prior art is concerned with reduction of triboelectric effect, the essence of this invention resides in the facile production of the same.

Realizing the necessity for the development of a sensing device which is readily portable and adapted to operate at a low current drain from batteries; being cognizant of the necessity for a device which is unaffected by temperature variations as well as the requirement for a device which is relatively unobtrusive or invisible, this invention was conceived. As a further objective, there occurred the necessity for the development of a device having a high sensitivity characteristic with respect to the perturbing effect of small mass which one encounters in the field, as for instance, in the census taking of animal life over a given area. In short, triboelectric effect or "high noise" was encouraged by the fabrication of a cable adapted to generate a maximum of friction between insulator and conductor or conductors upon the slightest displacement of the components of the cable.

Basically, the invention comprises a cable consisting of at least two conductor members, a flexible, deformable dielectric conduit, loosely spaced between the conductor members. Where stray fields are likely to be present, the cable may be surrounded by a flexible, deformable conducting shield, spaced from the dielectric conduit or conduits. This shield may be employed as one of the two conductor members, in which instance only one dielectric conduit shall be interposed between conductors. Cover means for the shield may be provided to seal the components of the cable against moisture. Essential to the construction of the invention is the provision for a loose, frictional-fit between one or both conductors and the interposed dielectric. A cable of such construction may be electrically connected to means for amplifying and registering signals, a convenient source of electrical energy being connected to the amplifier.

It is an object of this invention to provide a portable sensing device for use in the conduct of mammalian detection and the like, wherein the sensing elements are sufficiently delicate to register perturbances, such as may be created by small mammalian species, and wherein varying length of sensing element cable does not materially affect the efficiency of the device.

A further object of the invention is to provide a portable, highly sensitive detective device such as may be readily conformable to varying types of natural terrain and man-made structures, and wherein the source of current supply is sufficiently low, as in dry cell batteries, to adapt the device to facile field use.

A further object of this invention is to develop a cable which is adapted to serve as a triboelectric transducer for transmitting electrical impulses created by friction between conductors and interposed dielectric to an amplifying unit for the purposes of registering or recording signals indicative of movement which is in sufficient proximity to an area defined by the cable to induce a motion between components of the cable.

A further and advanced object of the invention is the adaptability of a triboelectric sensing cable for use as a fire detector.

Yet another object of the invention is to provide a sensing device which is operable upon deformation of the components of a cable thereof and in which any effort to disarm or compromise the device will result in the registering of a warning signal.

Additional and related objects will be readily understood from reference to the drawings in which like numerals refer to similar elements. In the drawings.

Figure 1:
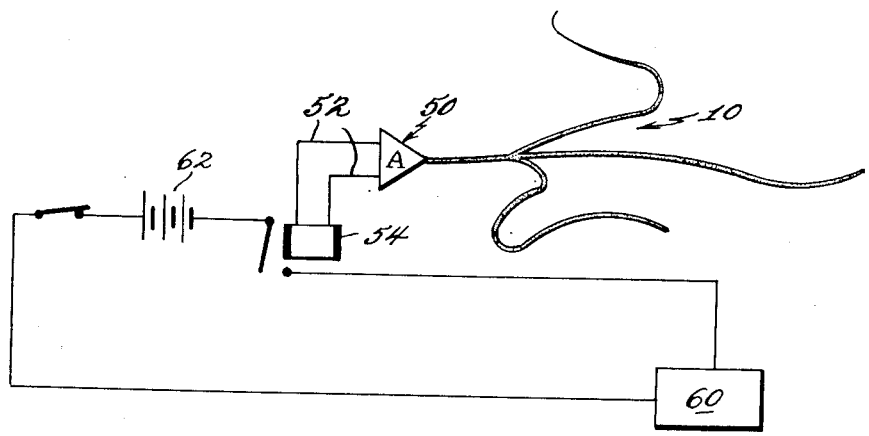
Fig. 1 is a schematic representation of the device in operation showing interconnection between the sensing element cable, amplifier, relay and related signal equipment.

With reference to Fig. 1 of the drawings, there is shown a sensitive cable 10 which is adapted to produce triboelectric current impulses upon deformation thereof. In electrical connection with the high noise cable, there is provided an amplier 50. The amplifier can be an audio amplifier wherein the high impedance of a cathode follower used as the input stage, enhances generation of the cable's maximum signal. As an alternative, a single cathode follower driving a non-indicating meter-type relay may be used. Relay 54 is therefore connected in series to the amplifier 50 by means of conductors 52.

The impulses received upon the slightest disturbance or deformation of the cable 10 may be sufficiently amplified to in turn effect an electronic recording of the impulse either by the energizing of a light signal, by the recordation of the amplified signal upon an audio recorder, or by the actuation of photographic recording as shown at 60 herein.

Figure 2:
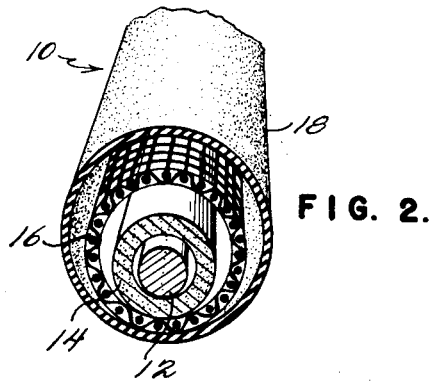
Fig. 2 is a perspective view in fragmentary section of a high noise cable adapted to produce triboelectric effect.

Referring to Fig. 2, a fragmentary perspective of a "high noise" cable 10 is shown. This cable consists of a conductor 12, a dielectric covering 14 therefor, a protective shield 16 which is likewise conductive and an hermetic seal 18 adapted to seal out moisture and debris. It will be appreciated that there is a loose, frictional-fit between each of the components of the cable 10, the purpose herein residing in the production of a maximum, usable signal upon disturbance of the cable. In this connection, applicant has experienced the generation of signals of from ½ to 500 millivolts in some cables, the variation in voltage being proportional to the frictional fit and to the deformation moment. As previously indicated, the production of a useful conductive cable heretofore required a tight, non-frictional fit between conductive and non-conductive components of a typical coaxial cable. To the contrary, in this invention the loose, frictional-fit is essential to produce the maximum triboelectric effect upon deformation of any portion of the high noise cable.

It is now apparent that deformation of the hermetic seal may simultaneously deform the shield 16 sufficiently to disturb dielectric 14, whereupon the conductor 12 in turn is disturbed and the inter-connection between the dielectric and either or both conductors 12 or 16 will be sufficient to create the signal impulse and conductance of the signal to the amplifier follows. In actual practice, massive deformation of the components is not essential to development of a signal. For instance, the slightest disturbance in the cable area may be sufficient to cause the components to shift with respect to one another, thereby to create a signal.

Figures 3, 4:
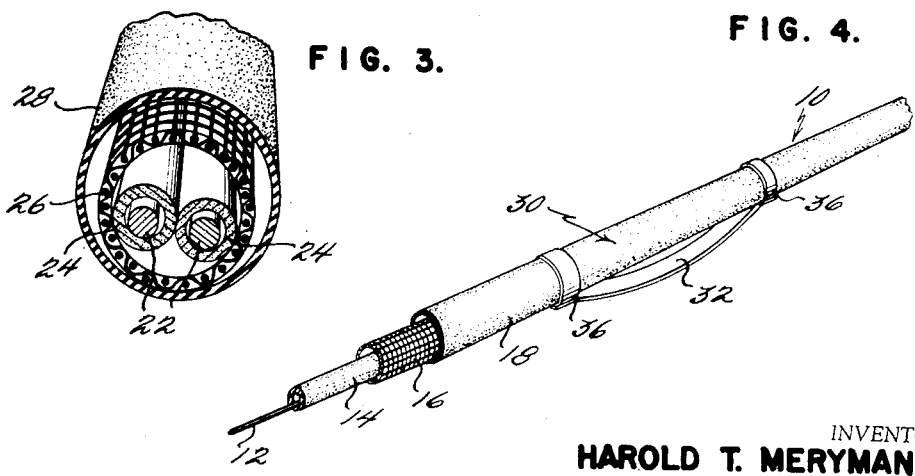
Fig. 3 is a perspective view in fragmentary section of a modification of the invention wherein a plurality of centrally disposed conductors are employed.
Fig. 4 is a fragmentary perspective view of a modification of the invention illustrating the combination of the device with means for detecting the presence of excessive heat.

Referring to Fig. 3, a modified form of the device is shown in cross-section. In this modification, a plurality of conductors 22 may be employed, each of the conductors being separated one from the other by loose, frictionally-fitting dielectric conduits 24. Protective shield 26 may surround the conductors and this protective shield is preferably formed of a resilient, spring-like material adapted to readily deform, to restore to original configuration upon release of deformation moments, and to protect conductors from interference due to stray electric fields. In this instance, as in the foregoing adaptations, the device should be hermetically sealed as by a sheath or cover 28. Although inessential to operation of the device, both the shield and seal are useful respectively under less than optimum operating conditions.

In Fig. 4, the cable 10 consisting of the loose fitting components: conductor 12, dielectric 14, resilient conductive shield 16 and seal 18 is provided with a number of suitably spaced detector elements 30. Each detector element 30 consists of a bi-metallic plate 32 or similar element having one metal of high thermal coefficient of expansion and another metal of a lower thermal coefficient of expansion. The detector element may be secured at ends to a cable 10 by any suitable means such as clamps 36. In the presence of heat, the bimetal detector will deform sufficiently to press against the exterior of the cable 10 thereby to shift cable components sufficiently to produce a signal impulse. The signal impulse thus generated upon deformation may be amplified to actuate an alarm or sprinkling system.

Whereas the cable described above utilizes almost entirely the triboelectric effect, we have found that when a difference in potential of several hundred volts is placed between conductor and shield, changes in their relative position will produce signals originating primarily from changes in capacity. In this modied adaptation, signals of increasing magnitude are obtained with increasing potential difference.

In actual field trials of both the capacitance and the triboelectric cables, we have provided a sensitive, rugged and highly convenient sensing element. Our preferred cable is very small and nearly invisible. It may be lain or thrown on the ground with complete abandon in any pattern and remains sensitive at every point along its length. Its sensitivity is continuously adjustable throughout the range of practicality. It cannot be disarmed without generating a signal and, if cut, the end attached to the amplifier continues to operate. The amplifier, employing low drain tubes, will operate for several weeks from a small battery pack. The output relay of the amplifier may be used to drive an alarm system or automatic photographic equipment.

Whereas we have described the invention with reference to specific embodiments thereof, it is to be understood that various adaptations of the invention may be employed without departing from the spirit of the invention as defined in the appended claims. For instance, there are varying means of amplifying signal impulses which are received from our high noise cable. Likewise, components of the high noise sensing cable may be varied slightly to obtain differing resistance to and development of deformation without departing from the invention as claimed.

The scope of our invention shall therefore be defined only as by the appended claims.

We claim:

1. A triboelectric sensing device of the type employed in warning systems and the like comprising a physically deformable, triboelectric voltage generating cable; an amplifier electrically connected to the cable; relay means in operable connection with the amplifier; signal means electrically connected to the relay, and a supply of electric power connected to the amplifier.

2. A device according to claim 1 in which the cable comprises at least two electrical conductors and a dielectric insulation element between conductors, said insulation element having a loose, friction-producing fit with said conductors.

3. A device according to claim 2 in which the cable carries an hermetic seal therefor.

4. A device according to claim 1 in which the cable comprises a shield, at least one electrical conductor disposed within the shield, and a dielectric interposed between conductor and shield, said dielectric having a loose, friction-producing fit between the conductor and shield to produce triboelectric effect upon deformation of the cable.

5. A device according to claim 4 in which the cable carries an hermetic seal therefor.

6. A device according to claim 4 further comprising means for placing a difference in potential between conductor and shield whereby to change the capacity between conductor and shield upon deformation and thereby to increase the magnitude of a generated signal.

7. A readily deformable cable comprising a shield, at least one electrical conductor disposed within the shield, and a dielectric interposed between the conductor and the shield, said dielectric having a loose, friction-producing fit between the conductor and the shield to produce triboelectric effect upon deformation of the cable.

8. In combination with an alarm system, a sensing cable comprising: at least one electrical conductor; a dielectric insulation element therefor, said insulation element having a loose, friction-producing fit with said conductor; and temperature variation responsive means connected to the cable for deformation contact with the insulation element upon critical temperature variation thereby to produce triboelectric effect upon deformation of the cable.

References Cited in the file of this patent

UNITED STATES PATENTS

| 1,584,613 | Comstock et al. | May 11, 1926 |
| 2,440,903 | Massa | May 4, 1948 |
| 2,622,691 | Ording | Dec. 23, 1952 |
| 2,708,742 | Harris | May 17, 1955 |